US008438657B2

(12) United States Patent
Kaleja

(10) Patent No.: US 8,438,657 B2
(45) Date of Patent: May 7, 2013

(54) METHOD FOR CONTROLLING THE ACCESS TO A DATA NETWORK

(75) Inventor: Stefan Kaleja, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 933 days.

(21) Appl. No.: 11/672,116

(22) Filed: Feb. 7, 2007

(65) Prior Publication Data

US 2007/0199048 A1 Aug. 23, 2007

(30) Foreign Application Priority Data

Feb. 7, 2006 (DE) .......................... 10 2006 005 565

(51) Int. Cl.
*H04L 29/06* (2006.01)

(52) U.S. Cl.
USPC .......... 726/29; 726/4; 726/7; 726/21; 726/27; 726/28; 705/3

(58) Field of Classification Search ......................... None
See application file for complete search history.

(56) References Cited

U.S. PATENT DOCUMENTS

| | | | | |
|---|---|---|---|---|
| 6,014,686 A * | 1/2000 | Elnozahy et al. | ............. | 709/202 |
| 7,043,760 B2 * | 5/2006 | Holtzman et al. | ............. | 726/28 |
| 7,127,432 B2 * | 10/2006 | Rubin et al. | ............. | 705/74 |
| 7,219,222 B1 * | 5/2007 | Durbin et al. | ............. | 713/100 |
| 7,359,885 B2 * | 4/2008 | Yan | ............. | 705/64 |
| 7,367,046 B1 * | 4/2008 | Sukiman et al. | ............. | 726/2 |
| 7,660,413 B2 * | 2/2010 | Partovi et al. | ............. | 380/33 |
| 7,676,473 B2 * | 3/2010 | Alperin et al. | ............. | 707/999.01 |
| 7,930,252 B2 * | 4/2011 | Bender et al. | ............. | 705/74 |
| 7,996,912 B2 * | 8/2011 | Spalink et al. | ............. | 726/26 |
| 2002/0010768 A1 * | 1/2002 | Marks et al. | ............. | 709/223 |
| 2004/0034774 A1 * | 2/2004 | Le Saint | ............. | 713/169 |
| 2004/0141661 A1 * | 7/2004 | Hanna et al. | ............. | 382/305 |
| 2005/0033994 A1 * | 2/2005 | Suzuki | ............. | 713/202 |
| 2005/0102167 A1 * | 5/2005 | Kapoor | ............. | 705/3 |
| 2005/0144144 A1 * | 6/2005 | Graff | ............. | 705/76 |
| 2005/0154795 A1 * | 7/2005 | Kuz et al. | ............. | 709/227 |
| 2005/0241004 A1 * | 10/2005 | Pyhalammi | ............. | 726/29 |
| 2006/0137000 A1 * | 6/2006 | Isaacson | ............. | 726/7 |
| 2006/0179472 A1 * | 8/2006 | Chang et al. | ............. | 726/2 |
| 2006/0184376 A1 * | 8/2006 | Graves et al. | ............. | 705/1 |
| 2006/0190999 A1 * | 8/2006 | Chen et al. | ............. | 726/11 |
| 2007/0016686 A1 * | 1/2007 | Hollebeek et al. | ............. | 709/238 |
| 2008/0263633 A1 * | 10/2008 | Banga et al. | ............. | 726/3 |
| 2008/0276307 A1 * | 11/2008 | Niwata et al. | ............. | 726/6 |

(Continued)

FOREIGN PATENT DOCUMENTS

JP 2005092416 A * 4/2005

OTHER PUBLICATIONS

Pereira, J. et al. "Design and Implemententation of a DICOM PACS with Secure Access Via Internet", Oct. 2001 IEEE. 4 pgs.*

*Primary Examiner* — Nathan Flynn
*Assistant Examiner* — Michael R Vaughan
(74) *Attorney, Agent, or Firm* — Schiff Hardin LLP

(57) ABSTRACT

A method for controlling access to a data network uses an end point identifier associated with an end point for control of the access to the data network. When a user X is logged in at the end point and a data query is directed from the end point to a data server, the data server uses the end point identifier of the end point in order to grant the user authorizations for data access.

13 Claims, 8 Drawing Sheets

U.S. PATENT DOCUMENTS

2008/0288466 A1* 11/2008 Eisenberger et al. .............. 707/3
2008/0289009 A1* 11/2008 Lee et al. ........................... 726/4
2009/0177495 A1* 7/2009 Abousy et al. ..................... 705/3
2009/0293106 A1* 11/2009 Gray et al. ......................... 726/4
2009/0313368 A1* 12/2009 Hollebeek et al. ............. 709/223
2010/0122336 A1* 5/2010 Hunt et al. ....................... 726/11
2012/0227113 A1* 9/2012 Wise et al. ....................... 726/29

* cited by examiner

METHOD FOR CONTROLLING THE ACCESS TO A DATA NETWORK

BACKGROUND

The invention concerns a method for controlling access to a data network with a data source and a plurality of end points engaged in data exchange with the data source, in which a user identification of a user working at an end point is checked by the data source and authorizations for the data processing that are associated with the user identification are granted to the user.

Such methods for controlling the access to a data network are generally known and serve for the authentication and authorization. The authentication is the process via which the identity of the user working with the end point is established. An end point is defined as a logical or physical unit that is designed to permit a user to exchange data with the data source via a user interface. The authorization is the procedure via which authorizations for manipulation of data are granted to a successfully authenticated user. The data are typically administered in a central data source, e.g., a data server. The authorization can thereby ensue on the basis of roles or groups.

A functional authorization is based on roles and assigns to the user the authorization for execution of specific work steps in a work process. Such work steps can, for example, comprise the quality assurance, the interpretation of image data, or the verification of image data.

The authorization for data access is based on the classification of the users in groups. Authorizations for access to a subset of the available data are granted to the user based on the associability of a user with a specific group.

In the medical field, image archiving and communication systems (what are known as PACS (Picture Archiving and Communication Systems) are operated on the basis of digital computers and networks. The PACS particularly serve to process and to administer diagnostic data of all types, for example, image data acquired in radiology and nuclear medicine.

The digital image data supplied by the diagnosis apparatuses, together with information about the identity of the patient as well as with information about the clinical question and the results of the examination, are typically stored on a central server (what is known as the PACS server). The image data generated by the diagnosis apparatuses can be retrieved from the PACS server at special workstation computers. In the event that it is required, the image data are digitally post-processed or subsequent structure measurements are implemented. After the assessment of the images in light of an illness history, a physician specializing in the implementation of diagnoses with the diagnosis apparatus generates a medical assessment report that is, for the most part, dictated and subsequently set in writing and associated with the image data. In the station and polyclinic field, treating physicians can then view the image data and the finding on typical workstation computers.

The diagnosis apparatuses, the PACS server, and the workstation computers for the physicians concerned with the diagnosis and the treatment thus form what is known as the PACS core system.

In order to enable an embedding of the entire PACS in a network with further components such as imaging systems (modalities) and image processing stations, the exchange of medical images is organized corresponding to the DICOM (Digital Imaging and Communication in Medicine) standard.

With the aid of the DICOM protocol, the data exchange occurs between DICOM nodes that must be known to one another for the data exchange. The DICOM nodes do not necessarily have to be linked with a physical apparatus. Rather, DICOM nodes can be distributed on a plurality of physical apparatuses. A physical apparatus can likewise present a plurality of DICOM nodes.

The DICOM nodes provide services and applications that are also designated as application units (application entities). The application entities can be unambiguously identified within the network with the aid of a logical address, what is known as the AET (Application Entity Title).

The application entities provide services for exchange of medical image data. Such services can, for example, be services for sending and receiving images (DICOM STORE) or services for querying information (DICOM QUERY). Differentiation is made between SCU (Service Class Users) and SCP (Service Class Providers). SCUs use the services of SCPs. For example, to send images from one DICOM node to another DICOM node, the sending service must be a DICOM STORE SCU while the receiving service must be a DICOM STORE SCP.

An application entity with a specific logical address can comprise a plurality of services. For example, an application entity with the application identifier AET1 can comprise the services STORE SCP, STORE SCU, QUERY SCP and QUERY SCU. A further DICOM node can comprise two application entities, for example, an application entity with the application identifier AET2A with the services STORE SCP and STORE SCU as well as a further application entity with the application identifier AET2B with the services QUERY SCP and QUERY SCU.

In the framework of the DICOM standard, components of the PACS core system can represent DICOM nodes. However, external DICOM nodes that are not components of the PACS core system can also exist in addition to these.

Within the PACS core system, the authentication and authorization of the users represents no problem, however, since non-DICOM protocols that allow an authorization and authentication of the users can be used for the data exchange and the access control.

But this works differently with the external DICOM nodes. In principle, the external DICOM nodes are in the position to query data from the central PACS server via the DICOM protocol. With the adoption of the DICOM Supplement 99—Extended Negotiation of User Identity, mechanisms were described that enable the transmission of the user identity, for example, upon data queries.

However, a requirement for this is that the user identity is transferred to the querying nodes. In consideration of the fact that the systems installed today typically do not offer this functionality, the implementation of this standard cannot be assumed in the next few years. Therefore, given a data query that emanates from an external node, the PACS server has two possibilities in principle: either an unlimited data access or no data access is granted. From the viewpoint of data security, both possibilities are unsatisfactory and do not satisfy the legal requirements for the security of the data.

The handling of data queries from external DICOM nodes that cannot be authorized moreover ties up resources and represents an additional network load that should be avoided if possible.

SUMMARY

Starting from this prior art, the invention is therefore based on the object to achieve a method for controlling the access to a data network that succeeds without the transfer of the user identification associated with a user.

This object is achieved via a method with the features described in detail below. This object is also achieved via an appertaining data server and appertaining end point computer for implementing the method, as well as a computer program product containing executable code on the respective server and end point computer.

According to an embodiment of the method, end point identifiers are treated as the user identification, and, corresponding to the end point identifiers, authorizations are granted to the users working at the end points. It is thus also then possible to control the access to a data network when no user identification can be transmitted from the end points to the data source. Data queries that cannot be authorized, which data queries are directed to the data source of the data network, can also be avoided. The resources of the data network are thus preserved and unnecessary network traffic is avoided.

In a preferred embodiment of the method, the authorizations for the data access to the data source are granted corresponding to the associability of the end point with a group. It is thereby possible to grant different groups of personnel different authorizations for the access to subsets of the database.

In a further preferred embodiment, the authorization for work steps in a work process is distributed corresponding to a role assigned to the end point. Authorizations for execution of work steps in a work process can thereby be granted to the users working at the end point corresponding to the function provided for the end point.

The properties of a non-interactive user identification are advantageously assigned to the end point identifier. Since no logging in is possible with a non-interactive user identification, additionally no password needs to be associated with the non-interactive user identification. It is therefore sufficient when the end point identification is transmitted from the end point to the data source. Moreover, a non-interactive user identification cannot be used at an interactive login. A misuse by users is therefore precluded.

Furthermore, the data network can be a medical data network in which data are exchanged according to DICOM and the end points of individual DICOM nodes are associated with application entities whose logical addresses are handled corresponding to the user identifications. In this method it is possible to also grant access to the data network to external DICOM nodes and to control this access.

The authorizations are advantageously granted corresponding to a hierarchical authorization system with a plurality of authorization levels, whereby the authorizations of a superordinate level include the authorizations of a subordinate level. Complex authorizations that particularly make the administration of patient data easier in the medical field can be granted with such an authorization system.

DESCRIPTION OF THE DRAWINGS

Further advantages and properties of the invention arise from the subsequent specification in which exemplary embodiments of the invention are explained in detail using the accompanying drawings.

DETAILED DESCRIPTION OF THE PREFERRED EMBODIMENTS

Figure 1:
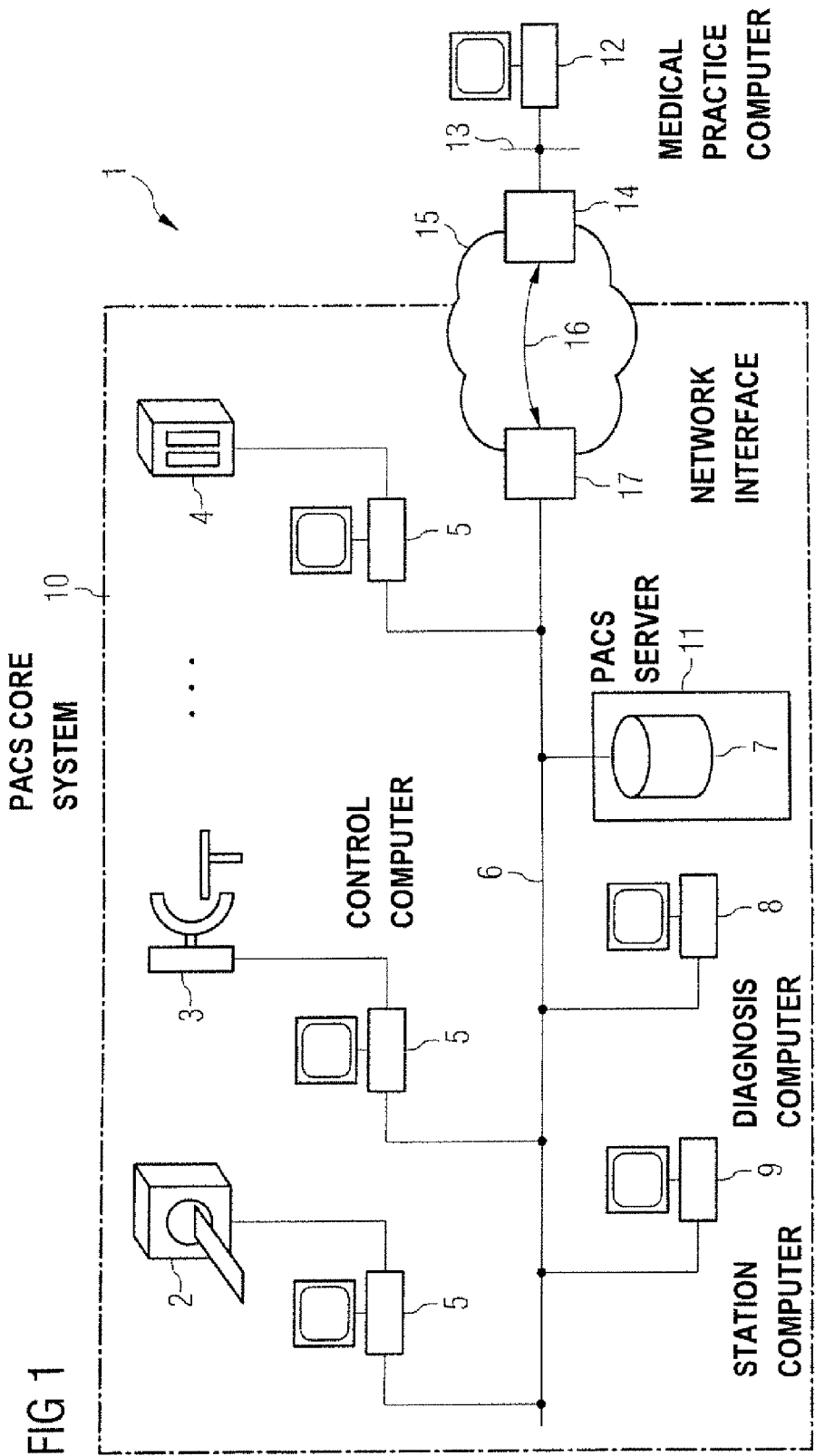
FIG. 1 is a pictorial diagram representing a medical data network.

FIG. 1 shows the schematic representation of a medical data network 1. The medical data network 1 serves for the processing of medical data of various modalities that are generated by the various diagnosis apparatuses. For example, a magnetic resonance apparatus 2, a computer tomography apparatus 3, and a conventional x-ray apparatus 4 are shown in FIG. 1. The medical diagnosis apparatuses are operated with the aid of control computers 5 (which can be workstation computers). The control computers 5 are connected to a local data network 6 and can store the generated image data in a central data storage 7.

The generated image data can be processed either on the control computers 5 or on special diagnosis computers 8. For example, on the basis of the image data, a physician specializing in diagnosis can implement structure measurements and add the findings to the image data. The processed image data and the findings can then be queried by healthcare personnel on a station computer 9 at the treating station.

The control computer 5, the diagnosis computer 8, the station computer 9, and the PACS server 11 together form a PACS core system 10 with a server-client architecture that comprises at least one PACS server and a plurality of PACS clients, namely the computers 5, 8 and 9.

In principle, the possibility exists to organize the data exchange within the PACS core system 10 according to the DICOM standard. However, within the PACS system, other protocols that allow a higher speed of data exchange are frequently used.

The PACS core system externally provides functionality according to the DICOM standard for the data exchange. For example, the PACS server 11 can form a DICOM node that offers the services required for delivery of image data. These services can be called upon by a DICOM node outside of the PACS core system 10.

Such a DICOM node situated outside of the PACS core system 10 is also designated as an external DICOM node. Such an external DICOM node can, for example, be a medical practice computer 12 that is connected to an external local data network 13. The local external data network 13 can, for example, be the local data network of an external medical practice. The local external data network 13 is connected with a global data network 15 via a network interface 14. A transmission of data to a network interface 17 of the local data network 6 can be arranged via the network interface 14.

A computer connected to the local data network 6 can also be an external DICOM node insofar as it does not belong to the PACS core system 10. This is the case when no PACS software that allow the computer to be integrated into the PACS core system 10 runs on this computer. Such a computer can, however, be in the position to exchange data with the PACS server 11 according to the DICOM standard insofar as the PACS server 11 assumes the function of a DICOM node.

Within the PACS core system 10, protocols are normally used that enable a control of the access by the user to the data stored in the data storage 7.

Figure 2:
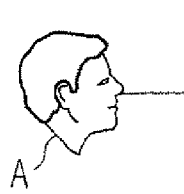
FIG. 2 is a pictorial diagram representing an access control within a core system of the medical data network from FIG. 1.
Figure 2:
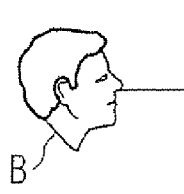
Figure 2:
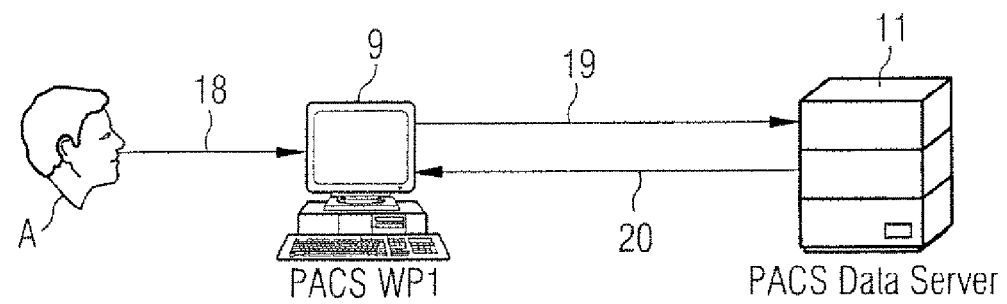
Figure 2:
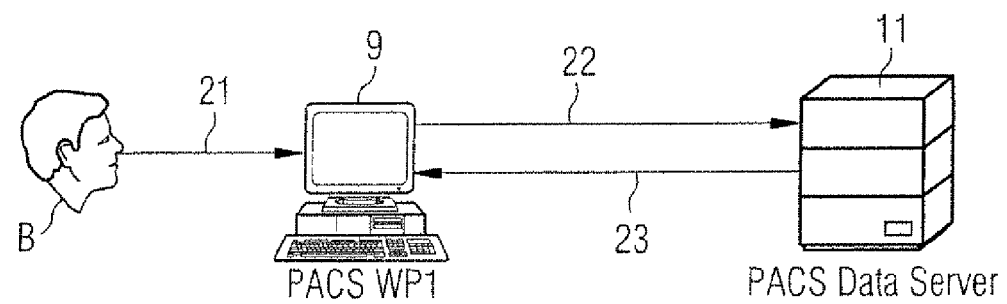

This is explained in detail using FIG. 2. In the case shown in FIG. 2, user groups W1 and W2 are associated with users A and B. For example, by logging in 18, the user A can gain access to a station computer 9 with the identifier PACS WP1. When the user A working at the station computer 9 executes a data query 19, query results 20 are delivered back from the PACS server 11 to the station computer 9. The query result 20 thereby corresponds to the authorizations of the user group W1, since the user A is assigned to the user group W1.

The user B can also gain access to the station computer 9 with the identifier PACS WP1 by logging on 21. When the user B then directs a data query 22 to the PACS server 11, a query result 23 is delivered back that corresponds to the authorizations of the user group W2, since the user B is associated with the user group W2.

In the case shown in FIG. 2, the data queries 19 and 22 do not need to be implemented according to the DICOM protocol. The control of the access to the PACS server 11 is, however, not implemented via the DICOM protocol; rather, further protocols applicable within the PACS core system 10 are used in order to implement the control of the access to the PACS server 11.

Figure 3:
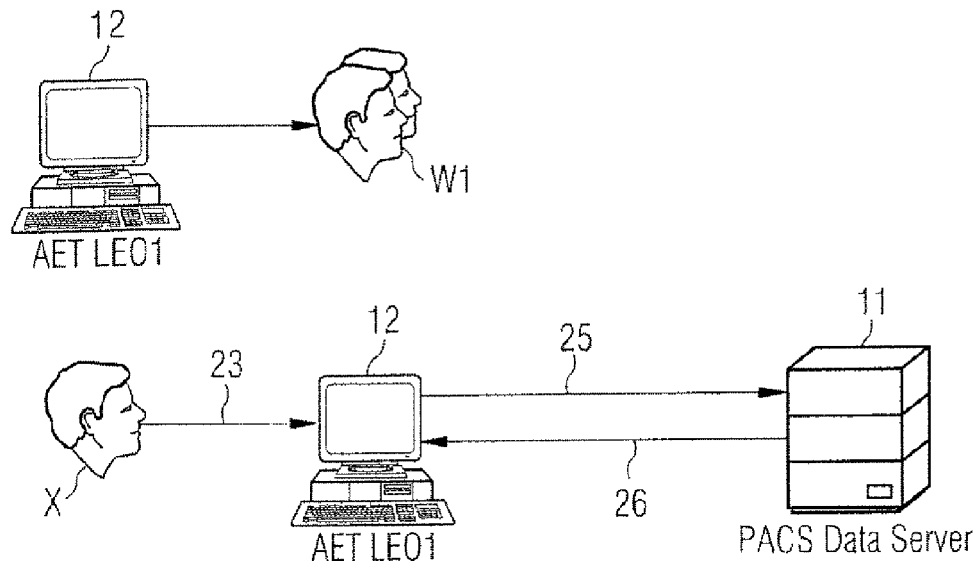
FIG. 3 is a pictorial diagram representing the access control of the access to a data network from FIG. 1 for an external node.

The case shown in FIG. 3 is now considered. In this case, an external DICOM node (namely the practice computer 12) is associated with the application identifier AET LEO1 of the user group W1. The identifier AET LEO1 is derived from the application entity with the logical name AET LEO1, which application entity runs on the external DICOM node formed by the practice computer 12. In this context, the logical address of an application entity is also designated as an application identifier.

By logging on 24, a user X who possesses a corresponding user account on the practice computer 12 can log onto the practice computer 12. When the user X directs a data query 25 to the PACS server 11, a query result 26 that corresponds to the authorizations of the work group W1 is supplied back to the practice computer 12 by the PACS server 11.

Since the DICOM protocol for the exchange of data enables the transmission of the logical addresses of an application entity, given an external DICOM node (such as the practice computer 12), a control of the access to the PACS server 11 can also be set up when the logical address of the application entity that is associated with the practice computer 12 is handled by the PACS server 11 as a user identification, and the PACS server 11 grants the authorizations of the user group W1 to the data queries 25 originating from the practice computer 12.

Figure 4:
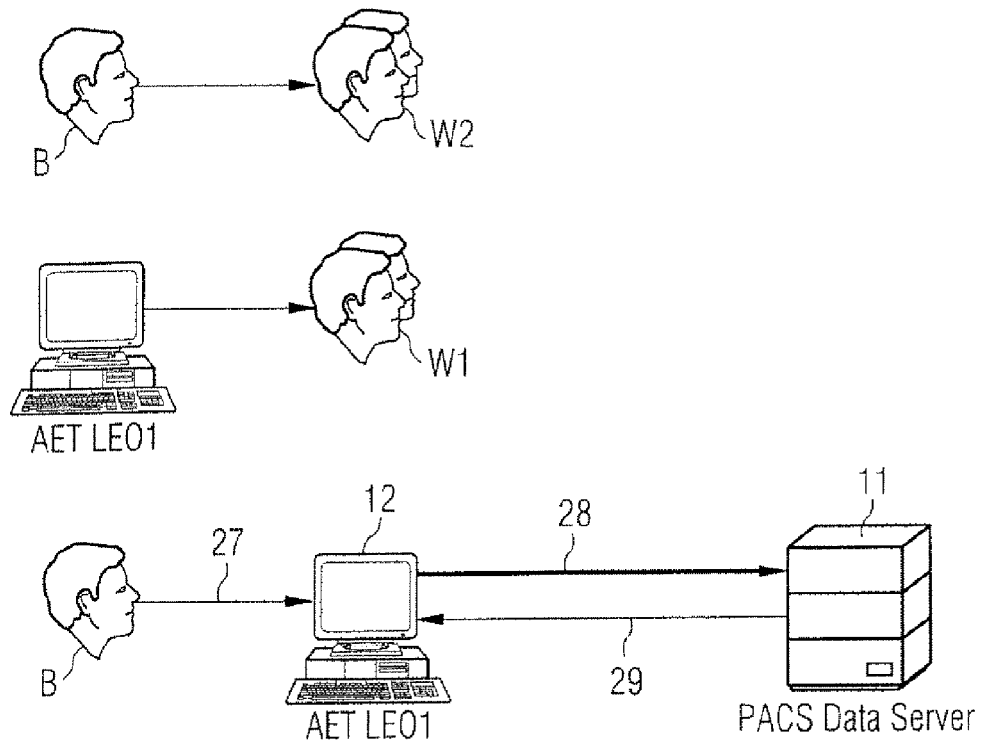
FIG. 4 is a pictorial diagram representing an access control of the access by an external node in a special case.

A special case in which a user B is associated with a user group W2 is shown in FIG. 4. An external DICOM node on which an application entity with the logical address AET LEO1 runs is associated with the user group W1. After logging on 27, the user B can work with the application entity AET LEO1 and direct a data query 28 to the PACS server 11. A query result 29 then corresponds to the authorizations of the user group W1 since the identifier of the external DICOM node that is sent to the PACS server 11 is associated with the user group W1. Insofar as the user B has access to the practice computer 12, the user B can receive access to data that are reserved to the user group W1.

However, if the PACS server 11 were not to interpret the logical address AET LEO1 of the application entity running on the practice computer 12 as a user name, the data query 28 could not be handled by the PACS server 11 since the PACS server 11 would be missing information required for the decision about an authorization. No user identifications can be transferred with the aid of the DICOM protocol, and the protocols used for authentication and authorization within the PACS core system 10 are not available outside of the PACS core system 10 in every case. Without the handling of the logical address of the application entity on the practice computer 12, the PACS server 11 could therefore only discard the data query 28 or grant unlimited data access. The first possibility would lead to unnecessary data traffic while the second possibility can not be allowed from the point of view of data security.

The handling of the logical address of an application entity that is associated with an external DICOM node can be used both for the functional authorization and for the data authorization. This is explained in detail using FIG. 5 and FIG. 6.

Figure 5:
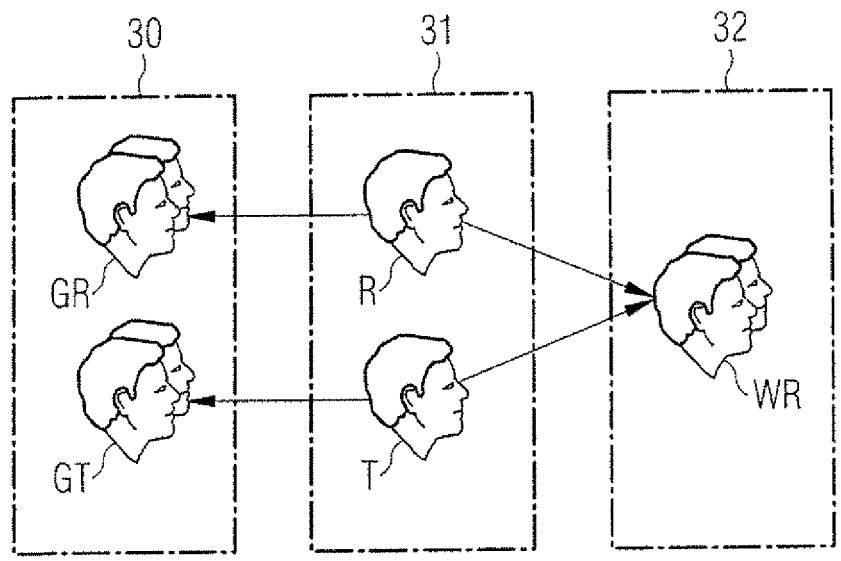
FIG. 5 is a pictorial diagram illustrating the authorization on the basis of roles.

The functional authorization is initially described using FIG. 5. The roles 30, the users 31 and the groups 32 are respectively charted in FIG. 5. In this figure, a radiologist and a technician are present as users. The role GR of a radiologist is assigned to the radiologist R and the role GT of a technician is assigned to the technician. The user group WR of the users working in radiology is allocated to both the radiologist R and the technician T. Since the radiologist and the technician execute different occupational functions, different functional authorizations must also be allocated to the different users. However, since both work in the same department (namely radiology), both must have access to the patient data and to the radiological examinations conducted for the patients.

Figure 6:
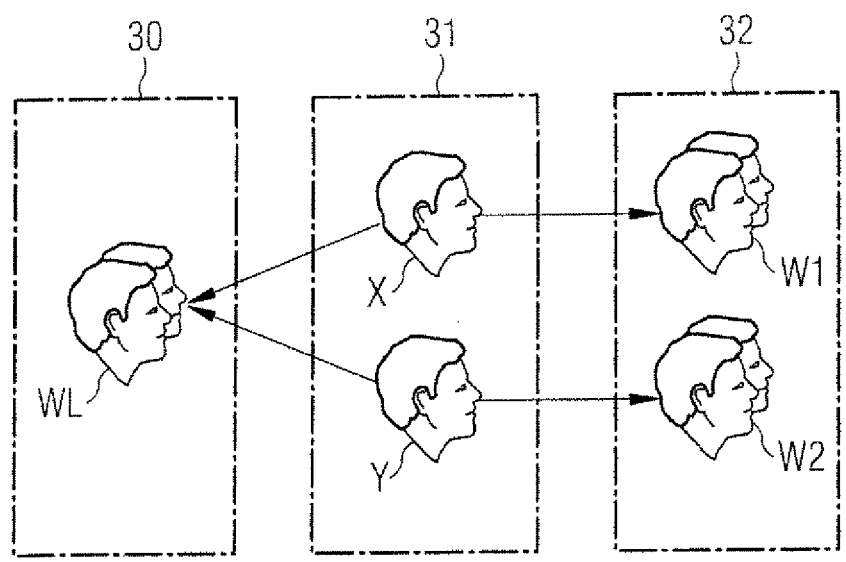
FIG. 6 is a pictorial diagram illustrating the authorization on the basis of groups.
Figure 7:
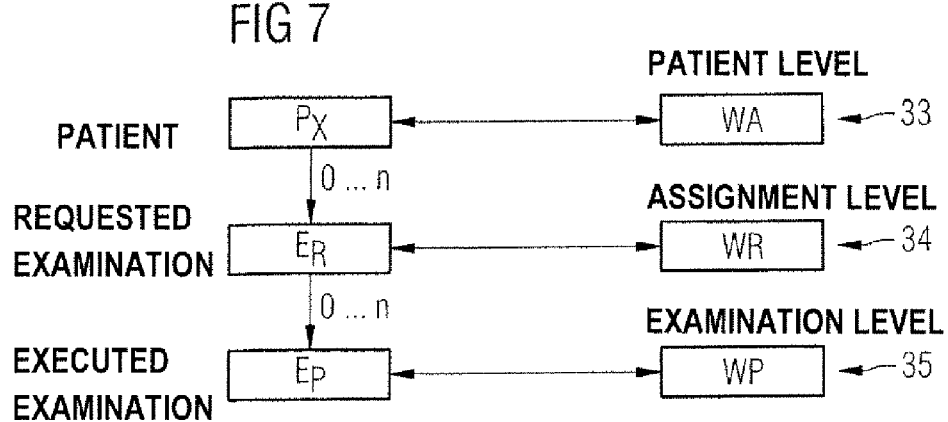
FIG. 7 is a block diagram illustrating a hierarchical authorization system with a plurality of authorization levels.

The case of a data authorization that is based on user groups is shown in FIG. 6. In this figure, the users are a physician X and a physician Y. The physician X directs the station W1 and the physician Y directs the station W2. Since both occupationally perform the same function, namely the role WL of a directing physician, the physicians X and Y must have the same functional authorizations. However, since both work in different departments, the physician X should have access only to the patient data that are handled in the station W1 and the physician Y should have access only to the patient data of the patients treated in the station W2.

Both the data authorization on the basis of groups and the functional authorization on the basis of roles can be executed here with the described methods.

For this purpose, the logical address of the appertaining application entity can be assigned either to a user group in the sense of the groups 32 or to a role 30. The authorizations of the respective user group or role are then assigned to a query emanating from the respective application entity. The allocation of complex access rights is thereby also possible since a plurality of user groups or roles can be associated with each application entity.

The logical addresses of the application entities that are transferred to the PACS server 11 with the aid of the DICOM protocol are handled in the same manner as conventional user identifications within the PACS core system 10. However, the actual user identification of the user working with the application entity at the external DICOM node is not taken into account.

The logical address of an application entity is advantageously accorded the status of a non-interactive user. As a consequence of this, the corresponding user account requires no access key (such as a password). Moreover, the logical address or application identifier transferred by the application entity is sufficient for the authentication and authorization. Moreover, the non-interactive user account cannot be used for an interactive user. The users are therefore not in the position to log in with the aid of the application identifier at the external DICOM nodes.

To check the authorization of the querying DICOM node, the PACS server 11 must check the arriving DICOM message with the data query with regard to the application identifier. The handling of the application identifier thereby corresponds to the handling of the user identification. In order to check the authorization of the application identifier handled as a user identification, the PACS server 11 then uses the same mechanism as in the control of the data access within the PACS core system 10 as shown in FIG. 2.

Complex access rights can also be set up with the method described here. On a patient level 33 of a treatment station WA, the treating physicians need access to all examinations of all patients that are attended to by the treatment station. However, the treating physicians might have no access to the data of the patients attended to at other treating stations.

On an assignment level 34 of an assignment station WR, a physician giving assignments must have access to the examinations that were assigned by him, but no access to the examinations assigned by other physicians. An external physician giving assignments should thus have access only to those examinations that were assigned by him.

On an examination level 35 of an examination station WP, the executing physician (for example, a radiologist in radiology), should have access to all examinations that have been executed by his examination station. However, the appertaining physician should have no access to the examinations that are executed by other examination stations, for example, cardiology.

A plurality of requested examinations ER can thereby be associated with each patient PX, and a plurality of implemented examinations EP can thereby be associated with each requested examination ER. The patients PX are associated with a treating station WA. The requested examinations are associated with a Job station WR and the executed examinations EP are executed by an examination station WP.

The relationship of the different authorization levels among one another is explained in detail in the following using FIGS. 8 through 12.

Figure 8:
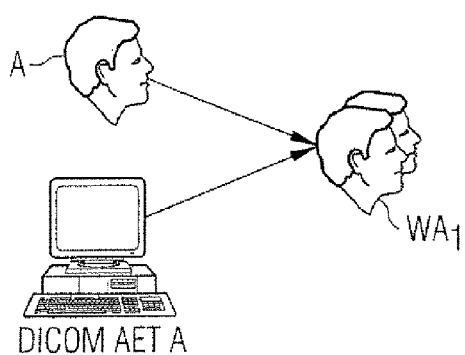
FIG. 8 is a pictorial diagram illustrating a possible access scenario in which a user and an external node are assigned to a treatment station.
Figure 8:
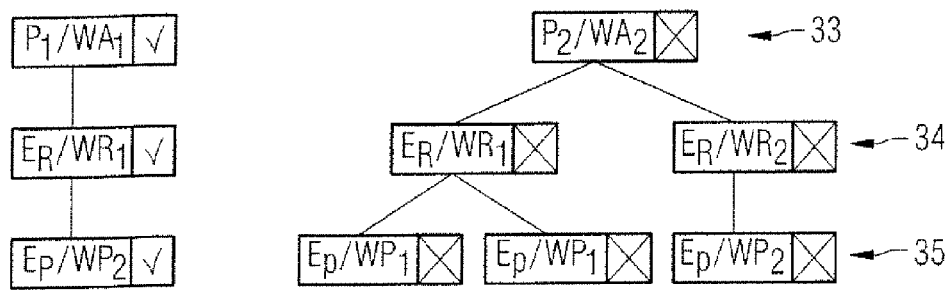

In the scenario shown in FIG. 8, a user A and a DICOM node with the application entity AETA are associated with a treatment station WA1. Both the user A and the DICOM node with the application entity AETA have access to the data of the patient P1 treated in the treatment station WA1, including the ordered examinations ER/WR1 and the implemented examination EP/WP2. The possible access is indicated in FIG. 8 by check marks.

However, in the scenario shown in FIG. 8, the user has no access to the data of the patient P2 who is cared for at the treatment station WA2 and also no access to the examinations ER/WR1 and ER/WR2 assigned to the patient P2, which examinations ER/WR1 and ER/WR2 have been assigned by the assignment stations WR1 and WR2, as well as no access to the examinations EP executed by the examination stations WP1 and WP2. The refusal of the access is expressed in FIG. 8 by x's.

Figure 9:
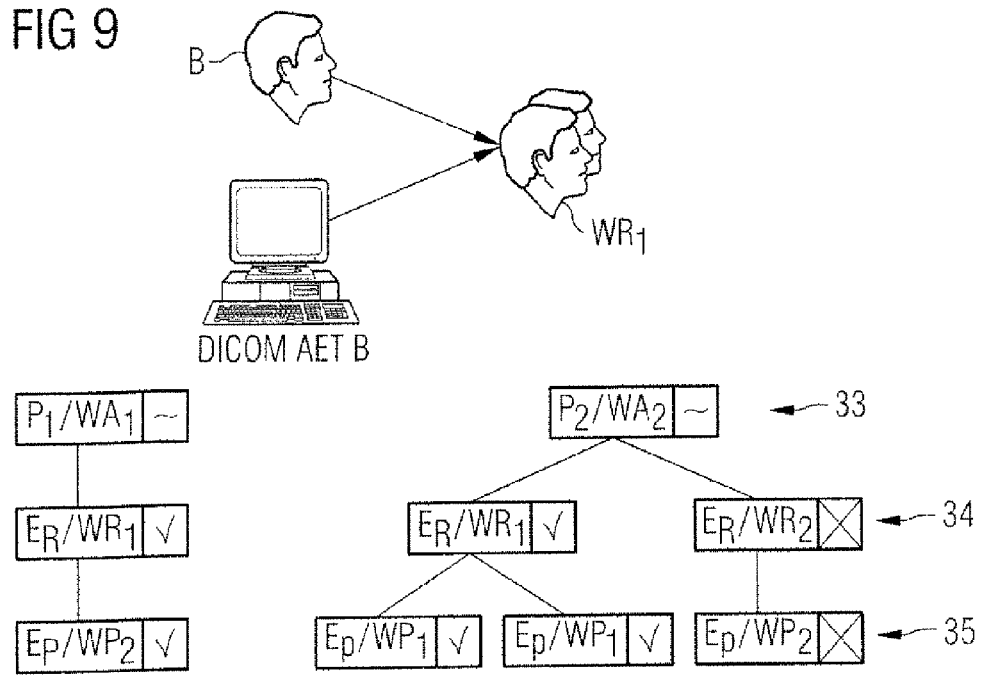
FIG. 9 is a pictorial diagram illustrating a second scenario in which a user and an external node are assigned to an assignment station.

In the further scenario shown in FIG. 9, a user B and an external DICOM node are associated with the application identifier AETB of an assignment station WR1.

The user B and the DICOM node with the application identifier AETB consequently have access to all examinations ER/WR1 assigned by the assignment station WR1 and the examinations ER/WR1 and EP/WP2 executed by the examination stations WP1 and WP2 corresponding to the assigned examinations ER/WR1.

The user B and the DICOM node with the application identifier AETB have no access to the examinations ER/WR2 assigned by the assignment station WR2. However, both have partial access to data of the patient level 33. Partial access means that the data on the patient level 33 (for example, the name of the patient) can be read out but not changed. The partial access is denoted by a tilde.

Figure 10:
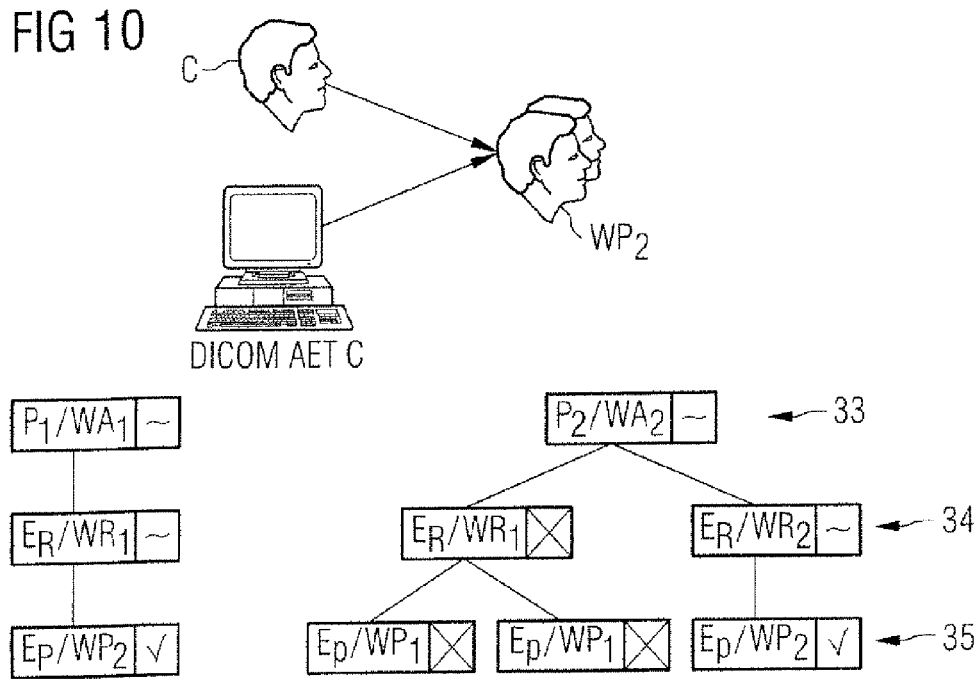
FIG. 10 is a pictorial diagram illustrating a third scenario in which a user and an external node are assigned to an examination station.

FIG. 10 shows a scenario in which a user C and a DICOM node with the application identifier AETC are associated with an examination station WP2. The user C and the DICOM node AETC have access to all examinations EP/WP2 executed by the examination station WP2, independent of whether the assignment station WR1 or WR2 has assigned the assignment. The user C and the DICOM node AETC also have partial access to the data of the patient level 33 and the assignment level 34. Partial access means that the data on the patient level 33 and on the assignment level 34 (such as the patient name or the description of the examination basis) can be read, but not changed.

Figure 11:
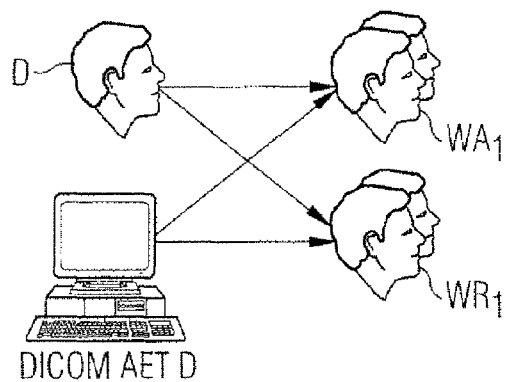
FIG. 11 is a pictorial diagram illustrating a fourth scenario in which the user and an external node are assigned to both a treatment station and an assignment station.
Figure 11:
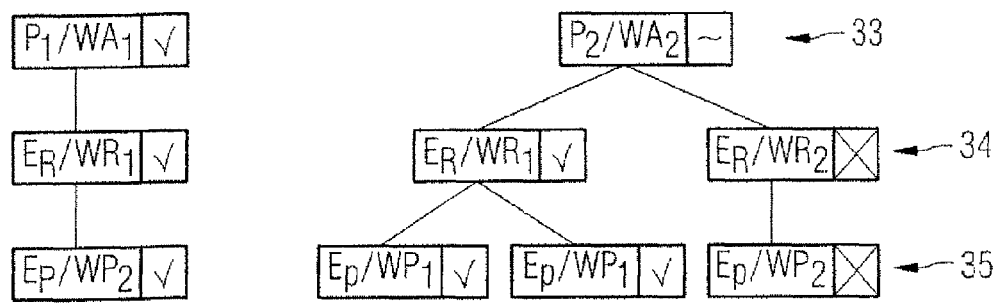

In the scenario shown in FIG. 11, a user D and a DICOM node AETD are associated with both a treatment station WA1 and a job station WR1. As a consequence of this, the user D and the DICOM node AETD both have access to the data of a patient P1 attended to in the treatment station WA1. Moreover, the user D and the DICOM node AETD have access to the examinations ER/WR1 assigned by the assignment station WR1, independent of whether the examinations ER/WR1 have been assigned to the patient P1 or P2. However, both have only a partial access to the data of the patient P2 that is situated in the treatment station WA2 and no access to examinations ER/WR2 that have been assigned by the assignment station WR2.

Figure 12:
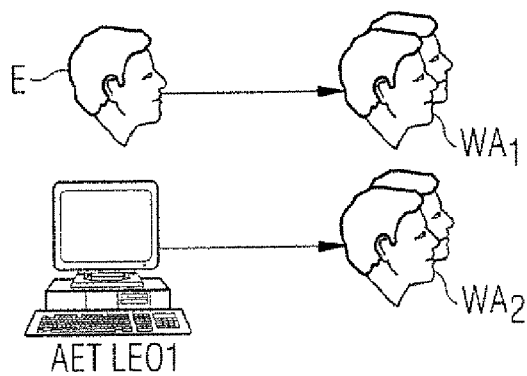
FIG. 12 is a pictorial diagram illustrating a fifth scenario in which a user and an external node are assigned to various stations.
Figure 12:
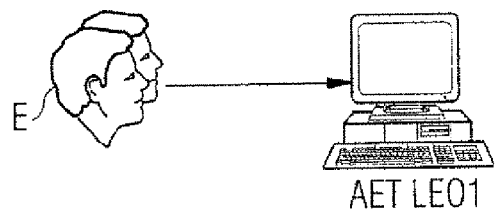
Figure 12:
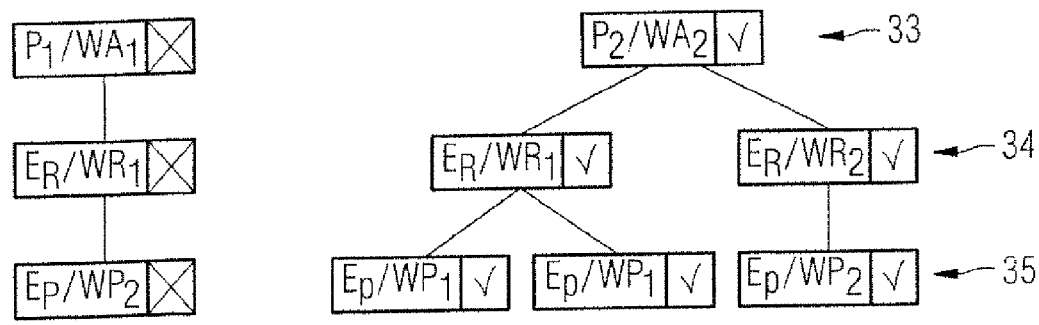

Finally, FIG. 12 shows a scenario in which a user E is assigned to a treatment station WA1 and a DICOM node ART LEO1 is assigned to a treatment station WA2. When the user E logs onto the DICOM node AET LEO1, the user E has full access to the patient data of the treatment station WA2 and to the assigned examinations ER/WR1 and ER/WR2 that have been assigned by the assignment stations WR1 and WR2 to the patient P2 of the treatment station WA2 as well as full access to the executed examinations EP/WP1 and EP/WP2 that have been executed by the examination departments WP1 and WP2 with regard to the patient P2.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A method for controlling access to a data network with a medical data source and a plurality of end points engaged in data exchange with the data source, comprising:
   interfacing with a user at an end point of the data network including receiving a user log-in at the end point from which the end point is able to determine an end point user identification of the user at the end point and log the user into the end point;
   receiving a request at the end point from the user for data exchange of medical data with the data source which is arranged for granting authorization for medical data exchange based on a data source user identification;
   transmitting the request for medical data exchange from the end point to the data source including transmitting an end point identifier of the end point and without transmitting the end point user identification;
   assigning properties of a non-interactive data source user identification to the end point identifier;
   treating the end point identifier as data source user identification by the data source; and
   granting authorizations for medical data exchange between the end point and the data source corresponding to the end point identifier.

2. The method according to claim 1, wherein the authorization for access to data of the data source is granted corresponding to an association of the end point identifier with a user group.

3. The method according to claim 2, wherein the end point identifier is associated with a plurality of user groups.

4. The method according to claim 1, further comprising the step of: granting an authorization for processing data stored in the data source according to an association of the end point identifier with a role.

5. The method according to claim 4, wherein the end point identifier is associated with a plurality of roles.

6. The method according to claim 1, further comprising the steps of:
   controlling the access to a medical data network by exchanging data according to the DICOM standard and by using a logical address as data source user identification on the medical data network after the logical address has been transmitted to a data server serving as a data source, the logical address being associated with an application entity and being used as the end point identifier.

7. The method according to claim 6, wherein the step of granting the authorizations comprises:
   granting the authorizations corresponding to a hierarchical authorization system with a plurality of authorization levels, wherein the authorizations of a superordinate level include the authorizations of a subordinate level.

8. The method according to claim 7, wherein authorizations for partial data access to data of a higher authorization level are granted to the association of an end point identifier with a subordinate authorization level.

9. A method as claimed in claim 7, wherein said plurality of authorization levels include a patient level, an assignment level and an examination level.

10. A data network including a medical data source and an end point computer connected on the data network, comprising:
    a process for checking an end point user identification of a user working at the end point computer including a user log-in at the end point computer, the process using the user log-in at the end point computer to determine the end point user identification of the user and to log the user into the end point computer;
    a process for granting, to the user, authorizations for medical data exchange between the user and the data source via the end point computer, the authorizations for medical data exchange being dependent on the user being logged in to the end point computer and being determined to have an end point user identification; and
    assigning properties of a non-interactive data source user identification to the end point identifier without receiving the end point user identification at the data source, wherein the end point identifier is treated as a data source user identification, and wherein the authorization is granted corresponding to the end point identifier.

11. An end point computer on a data network, comprising a processor configured to exchange medical data with a data source, the exchange of medical data being based on an authorization granted based on a data source user identification that corresponds with an end point identifier, wherein the processor operates to perform the steps of:
    receiving a user log-in on the end point computer from which the end point computer is able to log in the user and determine an end point user identification of the user at the end point computer, receiving a request for medical data exchange with the data source from the logged-in user having the end point user identification, sending the request for medical data exchange with the data source by the end point computer without transmitting the end point user identification from the end point computer over the data network, the request including an end point identifier of the end point computer, wherein properties of a non-interactive data server user identification are assigned by the data server to an end point identifier; and exchanging the medical data between the end point computer and the data source based on the data source treating the end point identifier as a data source user identifier.

12. A computer program product including tangible non-transitory computer readable media on which is stored a program for execution on a data server connected via a data network to an end point, the computer program product comprising code that when executed performs the steps of granting, to the user working at the end point, authorizations for data processing, which authorizations are associated with the user having an end point user identification and being logged-in to the end point, wherein properties of a non-interactive data server user identification are assigned by the data server to an end point identifier that is received from an end point at which the user is logged-in with an end point user identification without the end point transmitting the end point user identification from the end point to the data server, wherein the end point identifier is treated as a data server user identification by the data server, and wherein authorization for medical data exchange between the end point and the data server as requested by the user is granted based on the end point identifier received by the data server.

13. A computer program product including tangible non-transitory computer readable media on which is stored a program for execution on an end point computer connected via a data network to a data server, the computer program product comprising code that when executed on the end point computer performs the steps of exchanging data with a data source, based on an authorization granted based on an end point identifier, wherein the user logs in to the end point to determine the end point user identification of the user, wherein a request for medical data exchange from the end point to the data source by a logged-in user having the end point user identification includes the end point transmitting the end point identifier of the end point to the data source with the request for medical data exchange without transmitting the end point user identification to the data source so that the data is exchanged between the end point and the data source as a result of the data source treating the end point identifier as a data source user identifier, wherein properties of a non-interactive data server user identification are assigned by the data server to an end point identifier.

* * * * *